United States Patent [19]
Cornelia

[11] 3,758,125
[45] Sept. 11, 1973

[54] TOOL HOLDING DEVICE
[76] Inventor: Donald E. Cornelia, 115 Orchard Dr., St. Clairsville, Ohio 43950
[22] Filed: Oct. 21, 1971
[21] Appl. No.: 191,241

[52] U.S. Cl. .................. 279/103, 279/9, 279/1 T
[51] Int. Cl. ............................................. B23b 31/04
[58] Field of Search .................. 279/1 B, 1 F, 1 T, 279/76, 81, 69, 71, 70, 87, 89, 82, 103, 91, 101, 9; 90/11 A

[56] References Cited
UNITED STATES PATENTS
| | | | |
|---|---|---|---|
| 1,034,723 | 8/1912 | Mueller et al. | 279/91 |
| 3,405,950 | 10/1968 | Cox | 279/103 |
| 3,380,746 | 4/1968 | Benjamin et al. | 279/91 |

Primary Examiner—Gil Weidenfeld
Attorney—Peter N. Lalos et al.

[57] ABSTRACT

A tool holding device mountable on the spindle of a machine tool generally including a tool holder support mountable on the spindle for rotation therewith, the tool holder support having a socket disposed axially when the tool holder support is mounted on the spindle, a tool holder having a protruding portion received within the socket of the tool holder support for mounting the tool holder on the tool holder support, the tool holder having means for mounting a tool thereon, the tool holder and tool holder support having means operatively engageable when the tool holder is mounted on the tool holder support, for transmitting torque therebetween, and the tool holder support and the protruding portion of the tool holder having relatively movable portions provided with conical surface sections engageable in wedging relation when the protruding portion is received within the socket of the tool holder support and the engageable portions are relatively displaced helically to lock said tool holder and tool holder support together.

30 Claims, 8 Drawing Figures

PATENTED SEP 11 1973
3,758,125
SHEET 1 OF 3
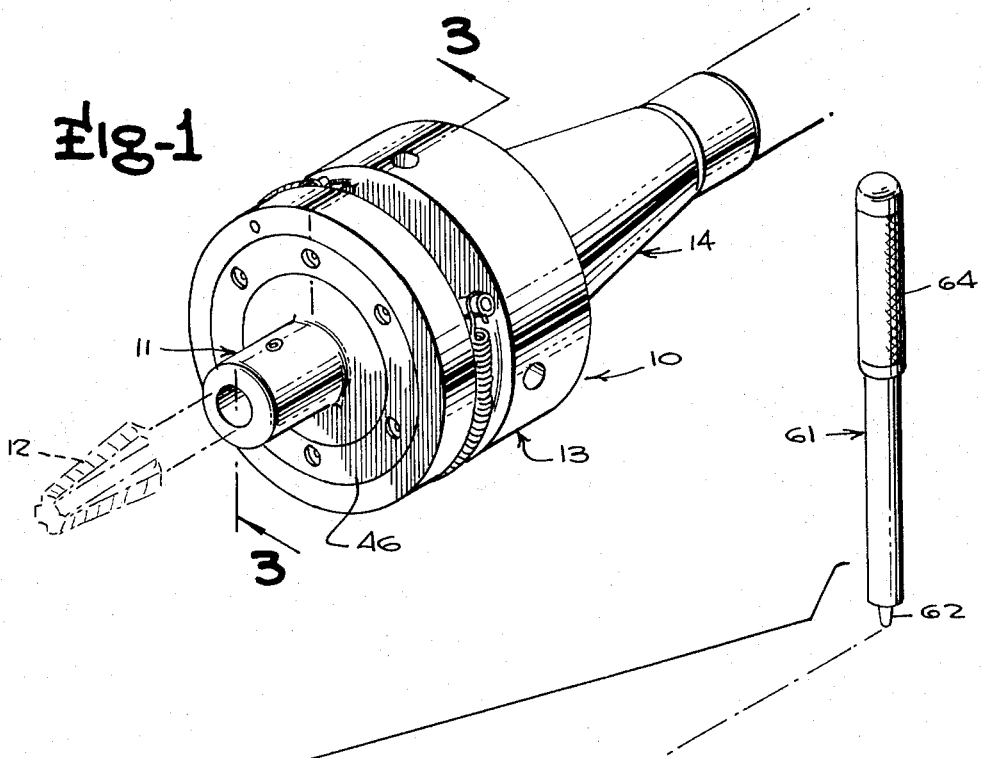
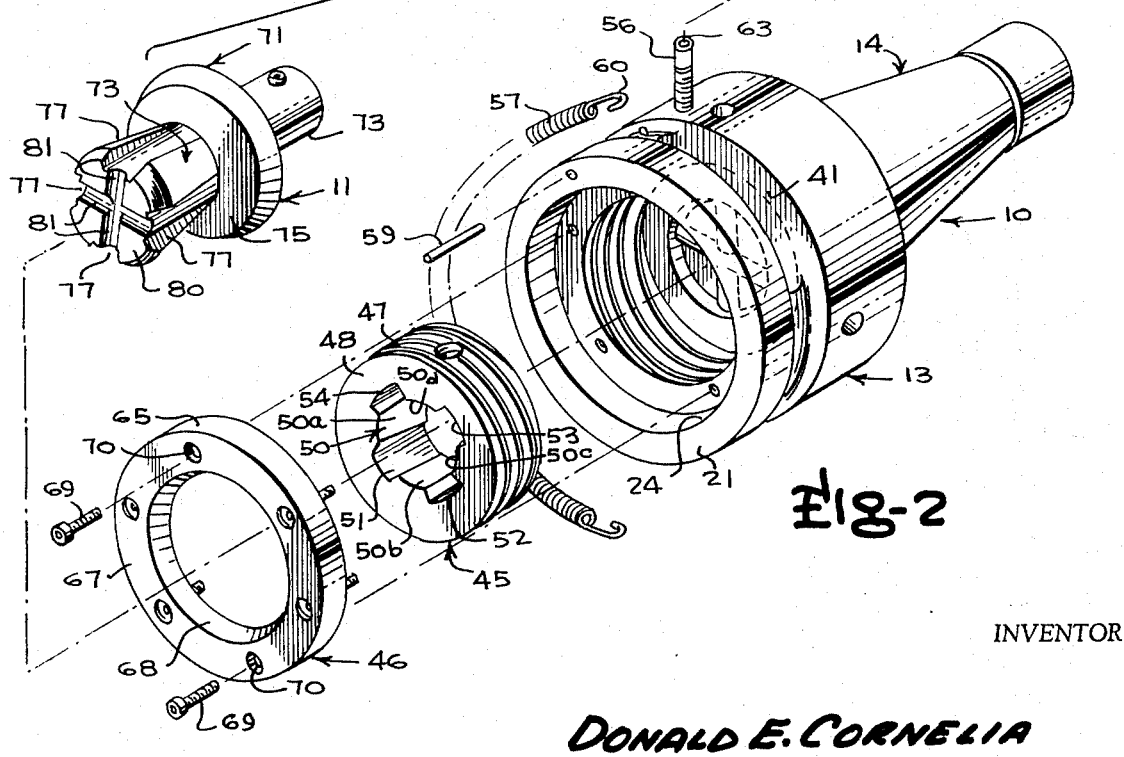
INVENTOR
DONALD E. CORNELIA
BY Mason, Fenwick & Lawrence
ATTORNEYS

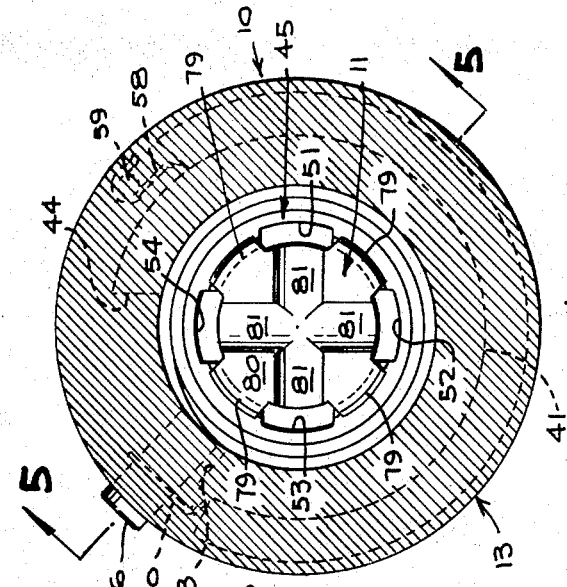
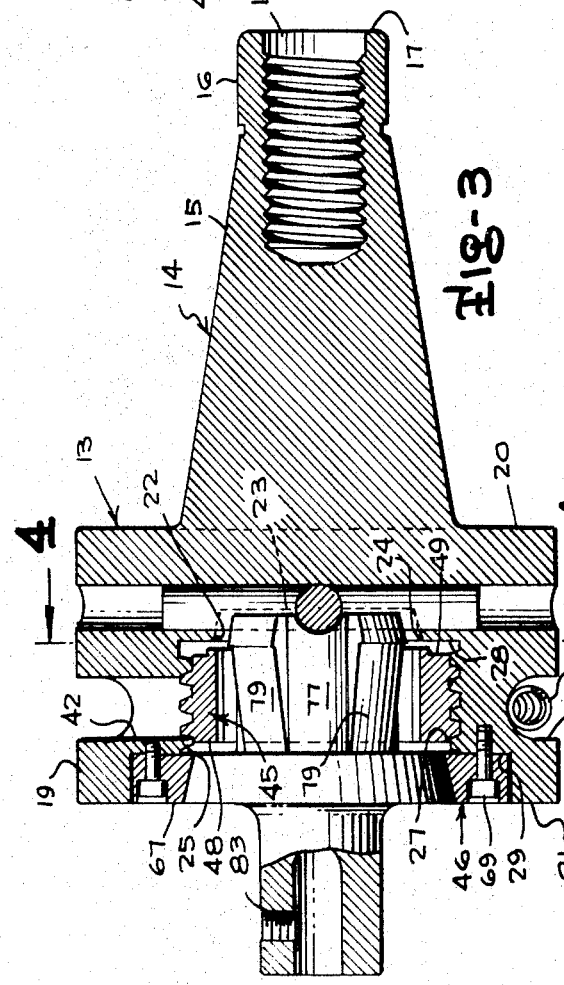
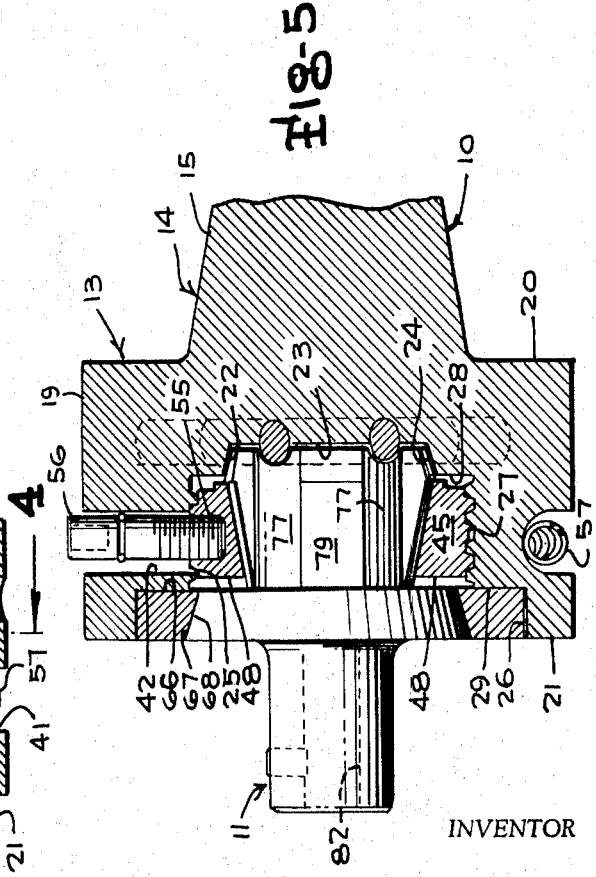
INVENTOR
DONALD E. CORNELIA
BY
Mason, Fenwick & Lawrence
ATTORNEYS

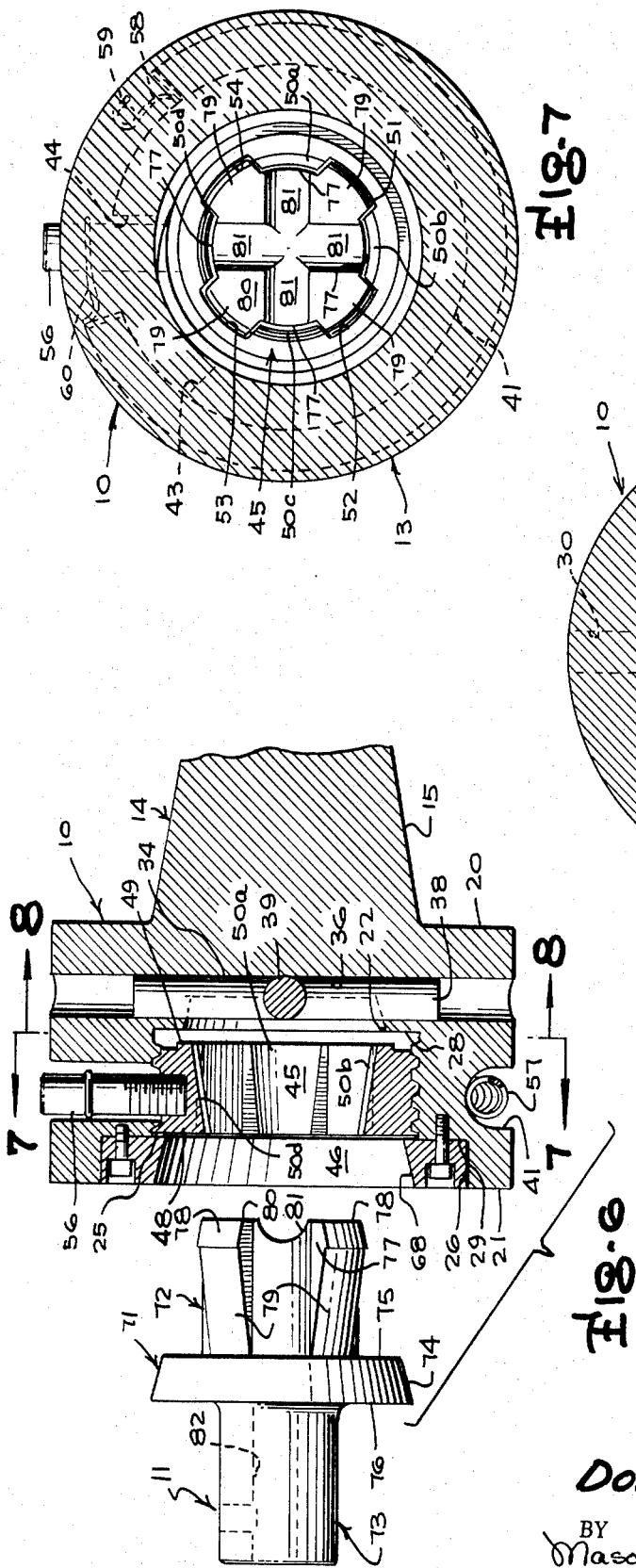

TOOL HOLDING DEVICE

This invention relates to a tool holding device and more particularly to a novel device mountable on the spindle of a machine for holding a tool, which is adapted to be readily assembled and disassembled.

In the machine tool industry, and particularly in the use of machine tools such as milling machines, it has been the conventional practice to utilize a machine tool to perform different machining operations on different workpieces or a single workpiece. Performing much different machining operations on different workpieces or a single workpiece has necessitated the repeated changing of working tools, resulting in a considerable amount of down time in the operation of the machine and consequently a loss of production time.

In the prior art, there have been developed numerous types of tool holding devices intended to minimize the amount of time required to change working tools on machine tools. It has been found, however, that such prior art devices are not effective in significantly reducing the amount of down time on a machine as a result of a tool changeover, are complicated in structure or comparatively expensive to manufacture.

Accordingly, it is the principle object of the present invention to provide a novel tool holding device.

Another object of the present invention is to provide a novel tool holding device mountable on the spindle of a machine tool.

A further objct of the present invention is to provide a novel tool holding device mountable on the spindle of a machine tool which is readily adapted to be assembled and disassembled in a minimum amount of time.

A still further object of the present invention is to provide a novel tool holding device for a milling machine.

Another object of the present invention is to provide a novel tool holding device mountable on the spindle of a machine tool, adapted to provide a rapid tool changeover thus minimizing the amount of down time of the machine and, correspondingly, a loss in production.

A further object of the present invention is to provide a novel tool holding device mountable on the spindle of a machine tool which is relatively simple in construction, comparatively inexpensive to manufacture, and effective in performance.

Other objects and advantages of the present invention will become more apparent to those persons having ordinary skill in the art to which the invention pertains, from the following description taken in conjunction with the accompanying drawings wherein:

FIG. 1 is a perspective view of an embodiment of the invention;

FIG. 2 is a perspective view of the embodiment shown in FIG. 1, illustrating the components thereof in exploded relation;

FIG. 3 is an enlarged cross-sectional view taken along line 3—3 in FIG. 1;

FIG. 4 is a cross-sectional view taken along line 4—4 in FIG. 3;

FIG. 5 is a cross-sectional view taken along line 5—5 in FIG. 4;

FIG. 6 is a view similar to the view shown in FIG. 3, illustrating the tool holder and tool holder support thereof in exploded relation;

FIG. 7 is a cross-sectional view taken along line 7—7 in FIG. 6; and

FIG. 8 is a cross-sectional view taken along line 8—8 in FIG. 6.

Briefly described, the present invention relates to a tool holding device mountable on the spindle of a machine tool generally including a tool holder support mountable on the spindle for rotation therewith, a tool holder mountable on the tool holder support, having means for mounting a tool thereon, the tool holder and tool holder support having means operatively engageable when the tool holder is mounted on the tool holder support, for transmitting torque therebetween, and the tool holder and tool holder support having relatively movable portions provided with conical surface sections engageable in wedging relation when the tool holder is mounted on the tool holder support and the engageable portions thereof are relatively displaced helically to lock the tool holder and tool holder support together.

In the preferred embodiment of the invention, the device includes a tool holder support having a socket disposed axially when the tool holder support is mounted on the machine tool spindle, a locking ring threadedly mounted in the socket of the tool holder support, and a tool holder having a protruding portion received within the socket of the tool holder support, through the opening of the locking ring, for mounting the tool holder in the tool holder support. In addition, the tool holder is provided with means for mounting a tool thereon, the tool holder and tool holder support are provided with means operatively engageable when the tool holder is mounted on the tool holder support, for transmitting torque therebetween, and the locking ring and the protruding portion of the tool holder are provided with conical surface section engageable in wedging relation when the protruding portion of the tool holder is received within the socket of the tool holder support, through the opening of the locking ring, and the locking ring is rotated to relatively displace the conical surface sections thereby moving the conical surface sections into and out of wedging relation and, correspondingly, the tool holder and tool holder support into and out of locking engagement.

Referring to the drawings, there is illustrated an embodiment of the invention, generally including a tool holder support 10 mounted coaxially on the spindle of a machine tool, such as a milling machine and a tool holder 11 mountable coaxially on the tool holder support 10, on which there is adapted to be mounted a working tool 12. The tool holder support consists of a main body section 13 and a reduced, rearwardly protruding section 14. The protruding section 14 is provided with a tapered surface 15, a cylindrical surface 16 and a rear surface 17 provided with an axially disposed, threaded bore 18 which is adapted to receive a threaded member of the machine tool spindle when the tool holder support is mounted on a machine tool. The protruding section 14 essentially consists of a conventional shank section of standard dimensions and configuration, which is adapted to be mounted in spindles of most conventional types of machine tools.

The main body section 13 of the tool support includes a cylindrical surface 19 which is disposed coaxially with the shank section 14, a rear end wall 20 from which the shank section 14 protrudes rearwardly, and a front end wall 21 provided with an axially disposed socket 22. The socket 22 has a substantially circular bottom wall 23, and a conically shaped side wall 24 provided with an enlarged intermediate bore 25 having a diameter greater than the maximum diameter of the conically shaped wall 24 and an enlarged end bore 26 having a diameter greater than the diameter of the intermediate bore 25. As best illustrated in FIGS. 3, 5 and 6 the enlarged intermediate bore 25 is threaded as at 27 and is provided with an annular shoulder 28. Similarly the end enlarged bore 26 provides an annular shoulder 29.

As best illustrated in FIG. 8, the main body section 13 of the tool holder support is provided with circumferentially spaced, radial openings 30 through 33 which are cylindrical, having the axes thereof substantially lying in the plane of the circular bottom wall 23 of socket 22 to provide semi-cylindrical grooves in bottom wall 23, spaced 90 degrees apart. Permanently secured within the openings 30 through 33 and seated in the semi-cylindrical grooves in the bottom surface 23 of the socket, are cylindrical pins 38 through 40.

The main body section 13 of the tool holder support further is provided with an annular groove 41 in the cylindrical surface 19 between the radial openings 30 through 33 and the front surface 21, substantially in alignment with the enlarged intermediate bore 25. As best seen in FIGS. 3, 5 and 6 the bottom of the annular groove 41 is curved and provided with an access slot 42 communicating with the intermediate enlarged bore 25 having threads 27. Referring to FIGS. 4 and 7, the access slot 42 is provided with end walls 43 and 44 which are circumferentially spaced a predetermined angle depending upon the design of the device.

The tool holder support further includes a locking ring 45 mountable in the enlarged intermediate bore 25, and a retainer ring 46 mounted in the enlarged end bore 26. As best illustrated in FIGS. 2, 6 and 7 the locking ring 45 is provided with an external thread 47 which is threaded on the internal threads 27 provided in the enlarged intermediate bore 25, a front wall 48 and rear wall 49 being spaced axially a dimension slightly less than the axial dimension between the planes of the annular walls 28 and 29, and a conically shaped, axial opening 50. The conically shaped opening 50 is provided with splines 51 through 54, defining circumferentially spaced, conical surface sections 50a through 50d. The bottoms of the splines 51 through 54 consist of circumferentially spaced, substantially cylindrical surface sections, and the conical surface sections 50a through 50d are tapered from an inner maximum radius, longitudinally outwardly and radially inwardly to an outer minimum radius, as best illustrated in FIGS. 5 and 6.

Disposed in the access slot 42 and threaded into a threaded hole 55 of locking ring 45, is a stud 56. The stud is disposed substantially radially relative to the axis of the tool holder support and is adapted to be moved within the slot 42 between the angularly spaced limit walls 43 and 44, to rotate the locking ring 45. As the locking ring 45 rotates, the threads 47 thereof coact with the threads 27 of the enlarged intermediate bore 25, causing the locking ring and, correspondingly, the conical surface sections 50a through 50d to move along helical paths about the axis of rotation of the locking ring. As previously noted, the distance between the front surface 48 and rear surface 49 of the locking ring is less than the axial distance between the planes of the annular shoulder 28 of enlarged intermediate bore 25 and the annular shoulder 29 of enlarged end bore 26 so that when the stud 56 is moved between angular limits defined by the end walls 43 and 44 of access slot 42, the locking ring 45 will be free to ride on the threads 27 without engaging the annular wall 28 or the inner wall 66 of retainer ring 46 as the locking ring and, correspondingly, the conical surface sections 50a through 50b are caused to move along helical paths.

As best shown in FIGS. 2, 4 and 7, the stud 56 is urged toward the limit wall 43 by means of coil spring 57 disposed within the annular groove 41, having a hook end 58 hooked onto a pin 59 rigidly secured to the end walls of the groove 41, and a hook end 60 hooked onto the stud 56. The locking ring 45 may be rotated aginast the action of the coil spring 57 by means of a handle 61 having a pointed end 62 which is adapted to be inserted within an end opening 63 in the stud 56, and a knurled end portion 64 which may be grasped manually.

The retaining ring 46 is adapted to be mounted in the enlarged end bore 26 and is provided with a cylindrical wall 65 having a diameter slightly less than the enlarged end bore 26, an inner annular surface 66 seatable on the annular shoulder 29, an outer annular surface 67 adapted to lie flush with the outer surface 21 of the main body section 13, when the inner surface 66 thereof is seated on the annular shoulder 29, and a conically shaped opening 68 disposed in alignment with conically shaped wall 24 of socket 22, and having an inner minimum diameter greater than the maximum diameter of the conical surface sections 50a through 50d. The retaining ring is secured to the main body section 13 by means of a plurality of bolts 69 which extend through a plurality of circumferentially spaced openings 70 and are threaded into registrable threaded openings provided in the annular shoulder 29 of the enlarged end bore 26.

The tool holder 11 consists of an intermediate section 71 receivable within the retainer ring 46, a rearwardly protruding section 72 receivable within the locking ring 45, and a forwardly protruding section 73 on which the tool 12 is mounted. The intermediate section 71 is provided with a conically shaped surface 74 which engages the conical surface 68 when the tool holder is mounted in the tool holder support, and a rear annular surface 75 and a front annular surface 76. The axial dimension of the intermediate section 71 is substantially similar to the axial dimension of the retainer ring 46 so that when the tool holder is mounted in the tool holder support with the surface 74 of the tool holder engaging the surface 68 of the retainer ring 46, the surfaces 75 and 76 of the intermediate section 71 will lie in the same planes as the surfaces 66 and 67, respectively, of the retainer ring, as best illustrated in FIGS. 3 and 5.

The rearwardly protruding section 72 is provided with a plurality of external splines 77 having a minor diameter slightly less than the minimum diameter of the conical surface sections 50a through 50d, and a major diameter slightly less than the minor diameter of the internal splines 51 through 54 of the locking ring 45. The width of each of the splines 77 is slightly less than the circumferential dimension between the side walls of adjacent, successive splines in the locking ring 45 so that the externally splined section of the tool holder will be received within the internally splined locking ring with the side walls of the splines being disposed adjacent to each other as in a conventional spline fitting.

The elongated tooth portions of the splined section 72 are provided with longitudinally rearwardly and radially inwardly tapered, conical surface sections 78, disposed in alignment with conically shaped surface 74 and engageable with conically shaped wall 24 of socket 22, and longitudinally forwardly and radially inwardly tapered, conical surface sections 79 which are provided with the same degree of slope as the conical surface sections 50a through 50d of locking ring 45. As best shown in FIG. 6, the conical surface sections 79 are tapered from a rearward or inner maximum radius, longitudinally and radially, outwardly or forwardly to a forward or outer minimum radius, and the longitudinal length of each of the conical surface sections 79 is greater than the longitudinal length of each of the conical surface sections 50a through 50d of locking ring 45.

As best shown in FIGS. 2, 3 and 7, the rear surface 80 of the splined section 72 is adapted to be disposed adjacent to the bottom wall 23 of socket 22 when the tool holder is mounted in the tool holder support, and is provided with semi-cylindrical grooves 81, spaced 90° apart, which are adapted to receive the semi-cylindrical portions of members 38 through 40 when conically shaped surfaces 74 and 78 engage surfaces 68 and 24, respectively. The engaging radial portions of the members 38 through 40 and the grooves 81 provide surfaces for transmitting torque between the members when the tool holder is mounted in the tool holder support as illustrated in FIG. 1.

Initially, in assembling the tool holder support, the pins 38, 39 and 40 are press fit into the opening 30 through 33 to provide the radial torque transmitting surfaces of the tool holder support. The locking ring 45 is then threaded into the enlarged threaded bore 25 of socket 22 so that the threaded opening for the stud 56 registers with the access slot 42. The stud 56 is then inserted through the access opening 42 and threaded into the locking ring 45. After the stud has been threaded into the locking ring, the coil spring 57 is placed in the annular groove 41 and the ends thereof are secured to the pin 59 and the stud 56 to cause the locking ring 45 to be threaded axially forwardly and counterclockwise relative to FIG. 4 until the stud 56 engages the end wall 43 of access slot 42. Finally, the retainer ring 46 is positioned in the enlarged end bore 26 and secured to the main body section 13 by means of bolts 69.

With the tool holder support thus assembled, the device may be utilized for a machining operation by placing the shank section 14 of the tool holder support in the spinle of a machine tool and threading it into position in the conventional manner. The tool 12 is then mounted on the forwardly projecting portion 73 of the tool holder whereby the shank of the tool is inserted into the axial opening 82 of the section 73 and secured into position by set screw 83. Next, the tool holder support is readied for mounting the tool holder therein by utilizing the handle 61 to rotate the locking ring clockwise relative to FIG. 7, against the action of the coil spring 56 thereby causing the locking ring 45 to ride along the threads 27 axially outwardly, away from the bottom wall 23 of the socket, and the conical section surfaces 50a through 50d to move along helical paths, outwardly.

With the locking ring thus held against the action of the coil spring 57 and in an outwardly threaded position, the intermediate section 71 and splined section 72 of the tool holder are inserted through the retaining ring 46 and locking ring 45, into the socket 22 of the tool holder support so that the conical surface 74 engages the conical surface 68 of the retainer ring 46, the elongated tooth portions 79 are received within the internal splines 51 through 54 of the locking ring, the elongated tooth portions of the internally splined locking ring are received within the splines 77 of the tool holder the surfaces 78 engage socket wall 24, the rear end surface 80 of the tool holder is disposed adjacent the bottom wall 23 of socket 22, and the semi-cylindrical exposed portions of pins 38 through 40 are received within and engage the semi-cylindrical grooves 81 in the rear end of the tool holder.

Under such conditions, each of the conical surface sections 79 of the tool holder will be disposed between successive conical surface sections 50a through 50d of the locking ring so that all of such conical surface sections will lie substantially in an imaginary, common conical surface. With the components thus positioned, the locking ring is permitted to rotate counterclockwise relative to FIG. 7 to a position as illustrated in FIG. 4 whereby the stud 56 is disposed adjacent but does not engage the limit surface 43 of access slot 42. As the tool holder support by virtue of the engagement of the pins 38 through 40 with the side walls of the grooves 81, and the locking ring 45 is caused to rotate counterclockwise relative to FIG. 7 and thread axially toward the bottom wall 23 of socket 22, the conical surface sections 79 will remain stationary while the conical surface sections 50a through 50d of the locking ring will move helically into engagement with the stationary conical surface sections 79 in wedging relation, to lock the locking ring 45 to the spline section 72 and, correspondingly, the tool holder 11 to the tool holder support 10.

The action of the coil spring 56 functions to maintain the conical surface sections 50a through 50d into wedging relation with the conical surface sections 79 so that the tool holder remains locked to the tool holder support. When the spindle of the machine tool is then driven, torque is transmitted to the tool holder support mounted on the spindle, and through the pins 38 through 40 to the tool holder 11 and the working tool 12 mounted thereon.

Whenever it is desired to change the tool holder, the spindle drive is brought to a rest, the handle 64 is used to rotate the locking ring clockwise relative to FIG. 4 to the position as illustrated in FIG. 7 thereby moving the conical surface sections 50a through 50d out of engagement with the conical surface sections 79 and, correspondingly, the locking ring 46 out of locking engagement with the tool holder 11, again positioning the elongated tooth portions of the internal splines of the locking ring into registry with the splines 77 of the tool holder, and the tool holder is removed axially from the socket of the tool holder support. The new tool holder is then inserted into the socket of the tool holder support and the locking ring is released to permit it to rotate under the action of the coil spring 56 and coact with the threads 27, causing it to thread into the socket and move the conical surface sections 50a through 50d into wedging engagement with the conical surface sections 79, thereby again locking the tool holder to the tool holder support.

It will be appreciated that changing tool holders or adaptors with the present invention requires but for about five seconds in comparison to prior art devices utilizing various types of wrenches and keys which require in the range of 40 to 90 seconds to effect a changeover. The reduction of changeover time thereby functions to increase the productivity of the operator of the machine tool.

It is contemplated that the components of the invention will be fabricated from any suitable materials conventionally used for machine tools, and will be designed to accomplish the purposes of the invention. It is preferred, however, that the design of the invention provide for easily aligning the tool holder 11 within the socket of the tool holder support to minimize changeover time and thus increase the efficiency of operation of the invention. In addition, it is contemplated that the design of the device would permit for an appropriate axial movement of the locking ring 45 to provide effective engagement and disengagement of the conical section surfaces 50a through 50d with the conical section surfaces 79 of the tool holder in wedging relation, and to align the elongated tooth portions of the with the splines 79 of the tool holder thereby permitting the tool holder to be inserted and removed freely from the tool holder support.

In a modification of the embodiment shown in FIGS. 1 through 8, the conical surface sections 50a through 50d are urged into wedging relation with the conical surface sections 79 of the tool holder by means of a yieldable, spring biased ball arrangement in lieu of the coil spring 57. Such modification would include a longitudinally disposed hole in one of the walls of groove 41, having a restricted opening and an end wall, a ball disposed in the hole and projecting through the restricted opening into the path of movement of stud 56, and a spring disposed in the hole, seated on the end wall of the hole and urging the ball through the restricted opening. In the use of such a retaining arrangement, as the stud 56 would be moved toward end wall 43, the stud would engage and be forced past the spring biased ball, to urge surfaces 50a through 50d into wedging relation with surfaces 79, and would be prevented from retracting by the ball unless forced manually. To unlock the tool holder, the stud 56 merely is forced manually past the ball.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A tool holding device mountable on the spindle of a machine tool comprising a tool holder support mountable on said spindle for rotation therewith, a tool holder mountable on said tool holder support, said tool holder having means for mounting a tool thereon, said tool holder and tool holder support having means operatively engageable when said tool holder is mounted on said tool holder support, for transmitting torque therebetween, and said tool holder and tool holder support having relatively movable portions provided with conical surface sections engageable in wedging relation when said tool holder is mounted on said tool holder support and said portions are relatively displaced helically to lock said tool holder and tool holder support together.

2. A tool holding device according to claim 1 including means for urging said conical surface sections into wedging relation.

3. A tool holding device according to claim 2 including means connected to one of said tool holder and tool holder support for moving said conical surface sections out of wedging relation, against the action of said urging means.

4. A tool holding device according to claim 1 wherein one of said portions is threaded onto one of said tool holder and tool holder support whereupon rotational movement of said one portion will provide said relative helical displacement between said conical surface sections.

5. A tool holding device according to claim 1 wherein said conical surface sections are tapered from an inner maximum radius, longitudinally outwardly and radially inwardly toward an outer end of said tool holder, to an outer minimum radius.

6. A tool holding device according to claim 1 wherein said conical surface sections comprise a pair of sets of circumferentially spaced conical surface sections.

7. A tool holding device according to claim 6 wherein said conical surface sections are tapered from an inner maximum radius, longitudinally outwardly and radially inwardly toward an outer end of said tool holder, to an outer minimum radius.

8. A tool holding device according to claim 1 wherein said torque transmitting means comprises at least one set of engageable radial surfaces.

9. A tool holding device according to claim 1 wherein one of said portions is threaded onto one of said tool holder and tool holder support whereupon rotational movement of said one portion will provide said relative helical displacement between said conical surface sections, said conical surface sections are tapered from an inner maximum radius, longitudinally outwardly and radially inwardly toward an outer end of said tool holder, to an outer minimum radius, said conical surface sections comprise a pair of sets of circumferentially spaced conical surface sections, and said torque transmitting means comprises at least one set of engageable radial surfaces.

10. A tool holding device according to claim 9 including means for urging said conical surface sections into wedging relation, and means connected to one of said tool holder and tool holder support for moving said conical surface sections out of wedging relation against the action of said urging means.

11. A tool holding device mountable on the spindle of a machine tool comprising a tool holder support mountable on said spindle for rotation therewith, said tool holder support having a socket disposed axially when said tool holder support is mounted on said spindle, a tool holder having a protruding portion received within the socket of said tool holder support for mounting said tool holder on said tool holder support, said tool holder having means for mounting a tool thereon, said tool holder and tool holder support having means operatively engageable when said tool holder is mounted on said tool holder support, for transmitting torque therebetween, and said tool holder support and the protruding portion of said tool holder having relatively movable portions provided with conical surface sections engageable in wedging relation when said protruding portion is received within the socket of said tool holder support and said engageable portions are relatively displaced helically to lock said tool holder and tool holder support together.

12. A tool holder device according to claim 11 wherein said socket is tapered.

13. A tool holder device according to claim 11 including means for urging said conical surface sections into wedging relation.

14. A tool holder device according to claim 13 including means connected to one of said tool holder and tool holder support for moving said conical surface sections out of wedging relation, against the action of said urging means.

15. A tool holder device according to claim 11 wherein one of said relatively movable portions is threaded onto one of said tool holder and tool holder support whereupon rotational movement of said one portion will provide said relative helical displacement between said conical surface sections.

16. A tool holding device according to claim 11 wherein said conical surface sections are inclined from an inner maximum radius, longitudinally outwardly and radially inwardly toward an outer end of said tool holder, to an outer minimum radius.

17. A tool holding device according to claim 11 wherein said conical surface sections comprise a pair of sets of circumferentially spaced conical surface sections.

18. A tool holding device according to claim 17 wherein said conical surface sections are tapered from an inner maximum radius, longitudinally outwardly and radially inwardly toward an outer end of said tool holder, to an outer minimum radius.

19. A tool holding device according to claim 11 wherein said torque transmitting means comprises at least one set of engageable radial surfaces.

20. A tool holding device according to claim 11 wherein one of said engageable portions is threaded onto one of said tool holder and tool holder support whereupon rotational movement of said one portion will provide said relative helical displacement between said conical surface sections, said conical surface sections are tapered from an inner maximum radius, longitudinally outwardly and radially inwardly toward an outer end of said tool holder, to an outer minimum radius, said conical surface sections comprise a pair of sets of circumferentially spaced conical surface sections, and said torque transmitting means comprises at least one set of engageable radial surfaces.

21. A tool holding device mountable on the spindle of a machine tool comprising a tool holder support mountable on said spindle for rotation therewith, said tool holder support having a socket disposed axially when said tool holder support is mounted on said spindle, a locking ring threadedly mounted in said socket, a tool holder having a protruding portion received within the socket of said tool holder support, through the opening of said locking ring, for mounting said tool holder in said tool holder support, said tool holder having means for mounting a tool thereon, said tool holder and tool holder support having means operatively engageable when said tool holder is mounted on said tool holder support, for transmitting torque therebetween, and said locking ring and said protruding portion of said tool holder having conical surface sections engageable in wedging relation when said protruding portion is received within the socket of said tool holder support, through the opening of said locking ring, and said locking ring is rotated to relatively displace said conical surface sections helically, to lock said tool holder and tool holder support together.

22. A tool holding device according to claim 21 including means operatively interconnecting said locking ring and said tool holder support for urging said conical surface sections into wedging relation.

23. A tool holding device according to claim 22 including means connected to said locking ring for moving said conical surface sections out of wedging relation, against the action of said urging means.

24. A tool holding device according to claim 21 wherein said conical surface sections are tapered from an inner maximum radius, longitudinally outwardly and radially inwardly toward an outer end of said tool holder, to an outer minimum radius.

25. A tool holding device according to claim 21 wherein said conical surface sections comprise a pair of sets of circumferentially spaced conical surface sections disposed on said locking ring and the protruding portion of said tool holder.

26. A tool holding device according to claim 25 wherein said conical surface sections are tapered from an inner maximum radius, longitudinally outwardly and radially inwardly toward an outer end of said tool holder, to an outer minimum radius.

27. A tool holding device according to claim 21 wherein said torque transmitting means comprises at least one set of engageable radial surfaces.

28. A tool holding device according to claim 21 wherein said conical surface sections comprise a pair of sets of circumferentially spaced conical surface sections on said locking ring and the protruding portion of said tool holder, said conical surface sections are tapered from an inner maximum radius, longitudinally outwardly and radially inwardly toward an outer end of said tool holder, to an outer minimum radius, and said torque transmitting means comprises at least one set of engageable radial surfaces.

29. A tool holding device according to claim 28 including means operatively interconnecting said locking ring and said tool holder support for rotating said locking ring and, correspondingly, urging said conical surface sections into wedging relation, and means connected to said locking ring for moving said conical surface sections out of wedging relation, against the action of said urging means.

30. A tool holding device according to claim 21 wherein said locking ring is internally splined, the protruding portion of said tool holder is externally splined and receivable within the internal spline of said locking ring, and the elongated tooth portions of said splines having conical surface sections tapered from an inner maximum radius, longitudinally outwardly and radially inwardly to an outer minimum radius.

* * * * *